UNITED STATES PATENT OFFICE.

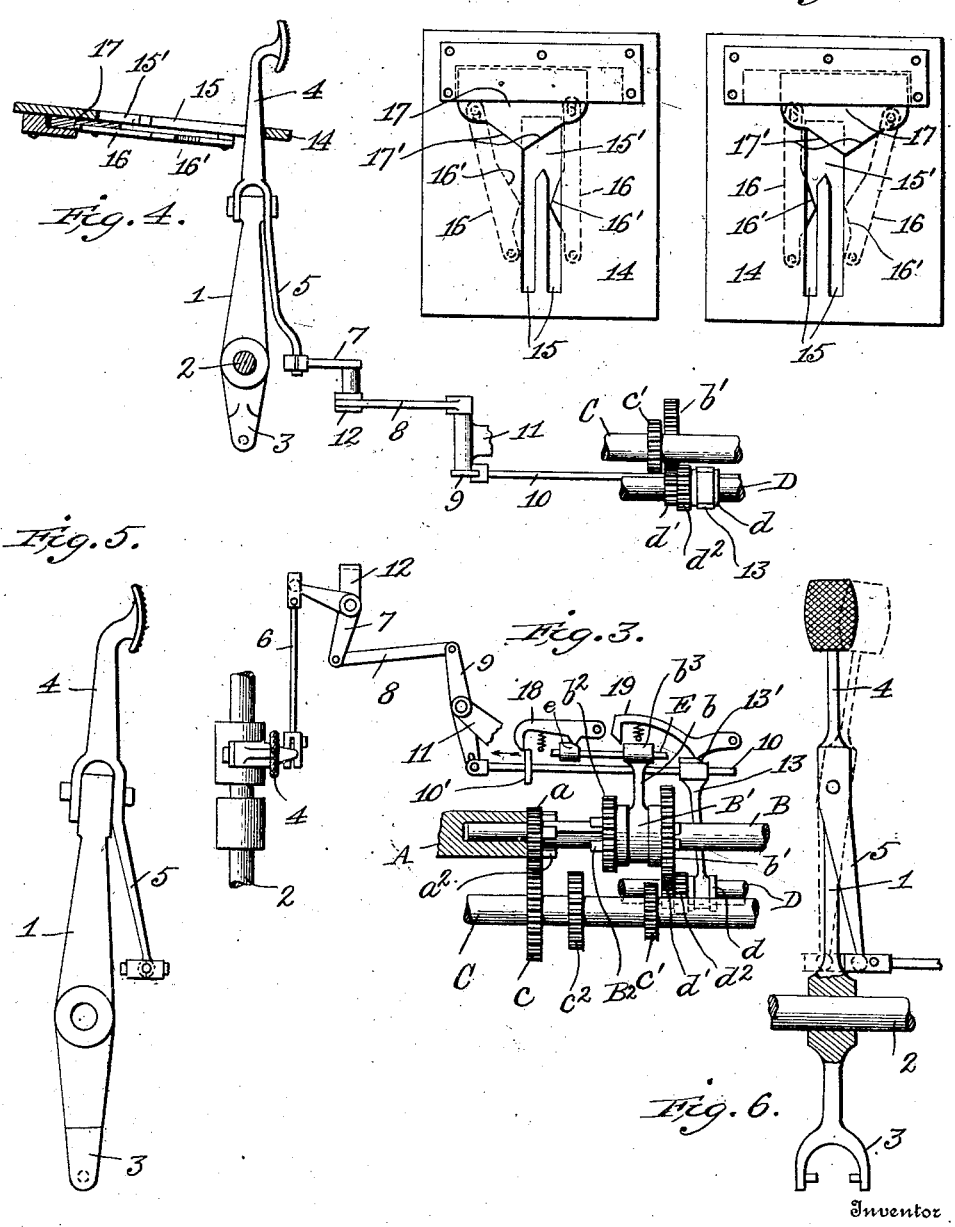

FERDINAND SCHORNO, OF PASSAIC, NEW JERSEY.

GEAR-OPERATING DEVICE.

No. 912,494.   Specification of Letters Patent.   Patented Feb. 16, 1909.

Application filed July 13, 1908. Serial No. 443,266.

*To all whom it may concern:*

Be it known that I, FERDINAND SCHORNO, a citizen of the Republic of Switzerland, residing at Passaic, county of Passaic, State of New Jersey, have invented certain new and useful Improvements in Gear-Operating Devices; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to improvements in gear operating mechanism for automobiles and the like, and the objects of the invention are to provide means whereby the clutch operating pedal may, in addition to performing its usual function, operate the reversing gears of the transmission, thereby dispensing with one of the hand operated levers, and to this end to provide means for automatically shifting the pedal laterally upon movement in one direction, in providing means for automatically operating the shifting means by the movement of the lever in the other direction; and to provide means for preventing the engagement of the reversing and forward gears simultaneously.

In the accompanying drawings:—Figure 1 is a bottom plan view of my improved pedal shifting device in position for moving the pedal to the right. Fig. 2 is a similar view of the device in position for shifting the pedal from right to left. Fig. 3 is a plan view of suitable change gear mechanism illustrating means for connecting the pedal with the reversing gears. Fig. 4 is a detail side view of said mechanism and pedal with the pedal operating device in section. Fig. 5 is an enlarged detail side view of the pedal, and Fig. 6 is a front view of the latter.

Corresponding and like parts are referred to in the following description and indicated in the several views of the drawings by the same reference characters.

The type of transmission mechanism shown is of the ordinary three forward speed and one reverse and comprises a power shaft A connected with the motor (not shown) and a shaft B from which the vehicle is driven, said shaft B is centered in shaft A but is normally disconnected therefrom.

Fixed on shaft A is gear $a$ in continuous mesh with gear $c$ on secondary shaft C. Splined on shaft B is a collar B' carrying gears $b'$, $b^2$. This collar is moved to the left from the position shown in Fig. 3 by means of a fork $b$, carried by a shifting rod E connected by suitable means to the usual shifting lever (not shown) mounted at the side of the vehicle. By such movement gear $b'$ will mesh with low gear $c'$ on shaft C and the drive will be through gears $a$, $c$, $c'$, $b'$. A further movement of collar B' to the left will disengage gears $c'$ and $b'$ and gear $b^2$ will be brought into mesh with high gear $c^2$ and the drive will be through gears $a$, $c$, $c^2$, $b^2$. The collar B' carries a clutch member B² and when said collar is further moved to the left gears $c^2$ $b^2$ will be disengaged and the clutch member B² will engage a clutch member $a^2$ carried by gear $a$ and shaft B will be driven directly from shaft A.

The reversing mechanism comprises an intermediate shaft D on which is splined a collar $d$ carrying gears $d'$, $d^2$ and when gears $b'$ $b^2$ are in a neutral position, as shown in Fig. 3, gears $d'$, $d^2$ may be shifted into mesh with gears $c'$, $b'$ respectively.

The mechanism hereinafter described for controlling and operating the reversing gears forms the subject of my invention and comprises a lever 1 fixed on a cross shaft 2 and having a fork 3, adapted to embrace in a well known manner the clutch-operating shaft (not shown). Pivoted to the upper end of lever 1 and forming an extension thereof is a foot pedal 4, and extending down from said pedal integral therewith is an arm 5. This arm 5 is connected with a main shifting rod 10 through the medium of rod 6, bell-crank lever 7, link 8 and two-armed lever 9 which latter and the bell-crank lever are pivoted respectively on brackets 11, 12 fixed to the frame of the machine.

The shifting rod 10 carries at its free end a fork arm 13 which embraces collar $d$ carrying the reversing gears as above described. The shifting rod 10 is moved longitudinally through the medium of the lateral movements of the foot pedal 4, which movements are imparted by the following mechanism.

A plate 14, mounted in the floor of the vehicle in front of the operator has two parallel slots 15 in which the foot pedal 4 is guided, said slots communicating at one end in a recess 15'.

On the under side of the plate are pivoted two levers, 16, each having a cam face 16' adapted to lie across its adjacent slot, and to these levers are pivotally connected a slide 17 which has a double cam face 17' adapted to project into the recess 15'.

It will readily be seen that when the foot pedal 4 is in the left hand slot, upon being moved to the end of said slot it will engage the cam face 17' lying across the recess and be shifted laterally to the right. This lateral movement will throw arm 5 in the opposite direction and shifting rod 10 will be moved in the direction of the arrow, Fig. 3, through the medium of bell-crank lever 7, link 8 and lever 9 and the reversing gears $d'$, $d^2$ will be moved into mesh with gears $b'$, $c'$.

When the foot pedal 4 moves backward in the right hand slot the cam face 16' of the right hand lever 16 will be engaged by the foot pedal and the slide 17 will be moved to the right into the position shown in Fig. 2 and at the next forward movement of pedal 4 the left hand cam face 17' of the slide will engage the pedal and shift it to the left whereupon the operating mechanism and reversing gears will be moved in the opposite position to that just described.

When the forward driving gears are in mesh the reversing gears cannot be operated, and vice-versa. When the gears $b'$, $b^2$ are moved to the left from the position shown in Fig. 3, a pivoted spring-controlled hook 18 is automatically moved into engagement with a collar 10' on shifting rod 10, thus locking the latter against movement to the left while either of said gears is engaged. To release the collar from hook 18 the rod E must be moved to the right disengaging gears $b'$, $b^2$ whereupon a cam $e$ on rod E will move hook 18 away from collar 10'.

When the shifting rod 10 is moved to the left to bring reversing gears $d'$, $d^2$ into mesh, a spring-controlled hook 19 moves into engagement with a sleeve $b^3$ on rod E preventing said rod from being moved to the left. When rod 10 is again moved to the right a cam 13' on arm 13 engages hook 19 and moves the same away from the sleeve $b^3$.

The operation of my invention has been sufficiently described in connection with the foregoing description of form and arrangement of parts to enable anyone to understand the same.

I claim:

1. The combination with a transmission mechanism, of a clutch operating member connected therewith, means to shift said member laterally to operate said mechanism and means operated by the movement of said member to operate the shifting means.

2. The combination with a transmission mechanism, of a clutch operating member connected therewith, means to shift said member laterally to operate said mechanism and means operated by the movement of said member to automatically operate the shifting means.

3. The combination with a transmission mechanism, of a clutch operating member connected thereto, a cam to engage said member, and means operated by the movement of the latter to shift the cam.

4. The combination with a transmission mechanism having reversing gears, of a pedal connected with the reversing gears thereof, a slide having cams thereon to impart a lateral movement to the pedal, and means operated by the movement of the pedal to shift the slide for the purpose set forth.

5. The combination with a transmission mechanism having reversing gears and a clutch operating pedal connected with the reversing gears thereof, of a shifting device for the pedal comprising a slotted member in which the pedal moves, a slide at the end of the slots having cams thereon to shift the pedal from one slot to the other and cam members connected with the slide operated by the movement of the pedal to shift said slide.

6. The combination with a transmission mechanism having reversing gears and a pivoted lever connected with the reversing gears thereof, of a shifting device comprising a plate having parallel slots therein through which said lever projects said slots communicating at one end, a slide mounted at the communicating end having two cam faces adapted to alternately engage the lever, and pivoted members connected to said slide having cams thereon adapted to lie in the path of the lever.

7. The combination with a pivoted lever, of a lever shifting device comprising a reciprocable member having oppositely directed cam faces thereon, adapted to alternately engage said lever, and operating members connected with said reciprocable members adapted to be successively actuated by said lever.

8. The combination of a lever comprising two parts pivoted together one part movable relatively to the other and means to actuate the relatively movable part positionable by the movements of the lever.

In testimony that I claim the foregoing as my invention, I have signed my name in presence of two subscribing witnesses.

FERDINAND SCHORNO.

Witnesses:
M. DAISY COLLARD,
GEORGE A. SNYDER.